April 29, 1930.  A. H. SHOEMAKER  1,756,665
PNEUMATIC TIRE AND RIM CONSTRUCTION
Filed Nov. 19, 1925
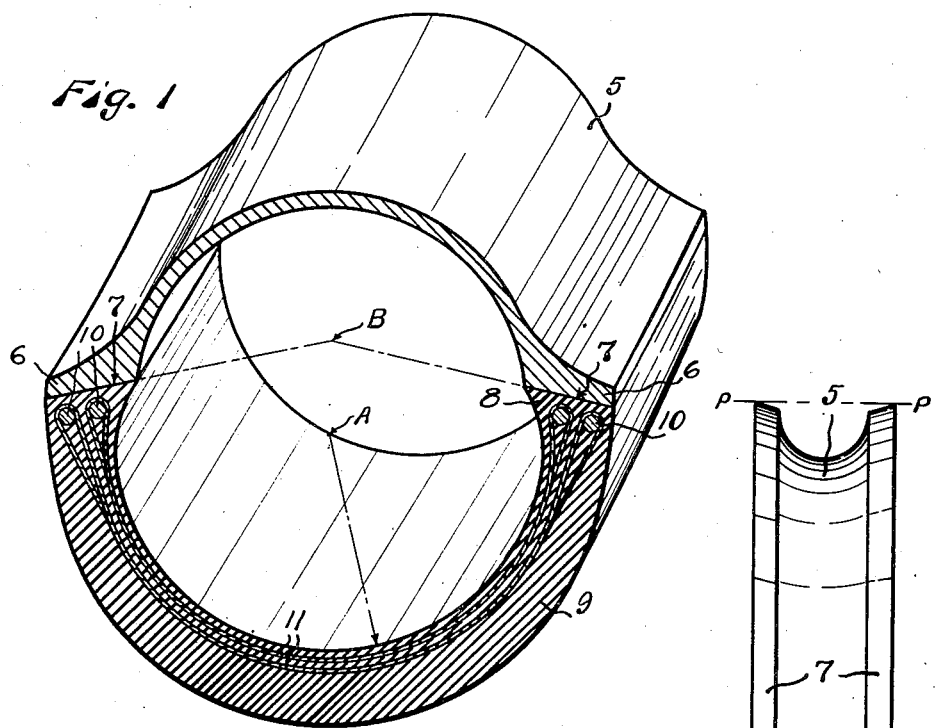
Fig. 1
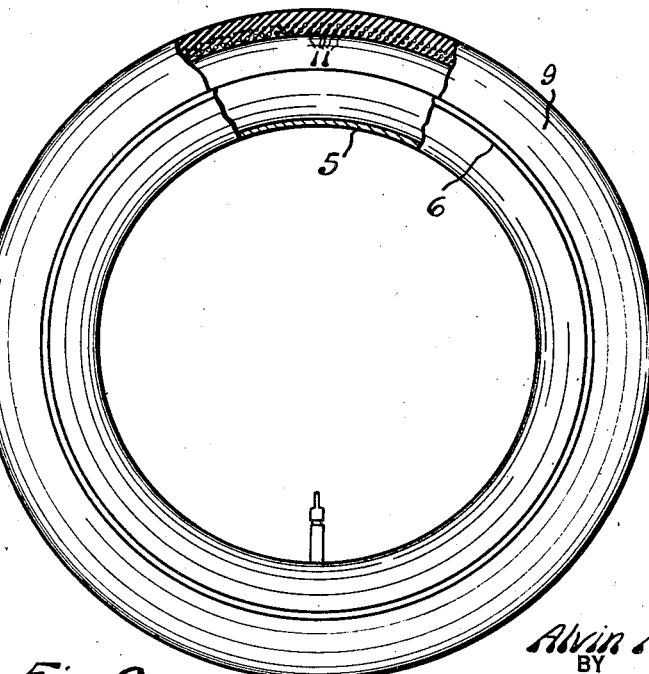
Fig. 2
Fig. 3
INVENTOR
Alvin H. Shoemaker
BY
Fred C. Matheny
ATTORNEY Patented Apr. 29, 1930

1,756,665

UNITED STATES PATENT OFFICE

ALVIN H. SHOEMAKER, OF SEATTLE, WASHINGTON

PNEUMATIC TIRE AND RIM CONSTRUCTION

Application filed November 19, 1925. Serial No. 69,995.

My invention relates to improvements in pneumatic tire and rim constructions of the form in which, what I term a semi-tire or half tire, is used on a peripherally grooved rim, and wherein substantially one half of the air from which the tire derives its resiliency is contained within the recessed rim and the other half within the semi-tire and said invention is in the nature of an improvement on the tire and rim construction disclosed in my prior Patent No. 1,510,709 issued Oct. 7, 1924.

A more specific object is to provide a tire and rim construction embodying a rim having an annular circumferential cavity forming an air chamber and having an inclined bead receiving portion free from abrupt shoulders that is arranged to receive the inclined bead portions of a semi-tire, whereby said tire bead portions will be caused to bind circumferentially very securely on said inclined bead receiving portions.

Further objects are to provide a tire that is cheap to construct due to the fact that it requires less rubber and less binder than the ordinary pneumatic tire of corresponding size; to provide a tire that may be very quickly and very easily demounted and that is not liable to become rim cut or to damage the tube in case of puncture; to provide a tire that is light in weight, is especially resilient and easy riding when inflated to relatively high pressure; and to provide a tire that will effect a saving in the power required to propel a vehicle over and above that required with the usual balloon type of tires of corresponding size and resilient qualities.

Other and more specific objects will be apparent from the following description taken in connection with the accompanying drawings.

In the drawings Figure 1 is a cross sectional view partially in perspective of a tire and rim constructed in accordance with my invention.

Fig. 2 is a view in elevation on a reduced scale of the same, parts being broken away.

Fig. 3 is a detached edge view of the rim.

Like reference numerals designate like parts throughout the several views.

Referring to Figs. 1, 2 and 3 the numeral 5 designates a circular rim that is adapted to be secured in any suitable manner to a wheel, not shown. The rim 5 is substantially semi-circular in cross section and the edges of said rim are flanged outwardly as at 6 to afford conical bead receiving surfaces 7 that are inclined relative to any plane tangential to the rim and are adapted to have the bead portions 8 of a semi-tire 9 seat thereon.

The semi-tire 9 may, if desired, be of standard tire construction, bound longitudinally as with longitudinal or diagonal cords or fabric, so that said tire can not expand longitudinally. I prefer however to provide in each tire bead 8 two non-elastic bead rings 10 that constitute the only binder running lengthwise around the tire and to reinforce the tire with cords 11 that run crosswise or near enough crosswise between the rings 10 of the two beads to form a transverse binder but leave the tire free to expand longitudinally except for the bead rings. The bead rings 10 are non-elastic, as for instance said bead rings may be continuous hoops of steel that will not stretch when forced up onto the inclined bead receiving portions 7 of the rim but will bind circumferentially on said rim. Those portions of the tire beads that engage the rim are preferably formed of harder rubber than the remainder of the tire.

The bead receiving portions 7 are inclined in such a direction that their planes projected would intersect within the recessed rim, as at the point B, said incline being so that the force of compressed air within the tire will force the bead portion 8 outwardly and up said inclines.

The tire 9 is without the usual side walls and is similar to the tread portion of an ordinary pneumatic tire that has its side walls removed and has the bead rings 10 incorporated therein.

The tire 9 constitutes substantially a semi-circle whose inner wall and whose cords 11 have the center A, as shown in Fig. 1. If the tire is substantially less than a semi-circle then I find that internal pressure of the air will tend to cause the bead portions of the tire to move inwardly and leave the bead receiving portions of the rim instead of binding tightly thereon, but, as illustrated herein, the tire 9 being greater than a semicircle will have its bead portions forced outwardly by the pressure of air interiorly thereof.

When the tire shown in Figs. 1 and 2 is inflated the bead portions 8 of the tire will be forced outwardly and up the inclines 7 and will be seated so firmly on the bead receiving portions 7 of the rim that they will form an air tight joint permitting the tire to be used without an inner tube.

The angles of the inclined bead receiving portions 7 may be varied within certain limits but, in order to secure satisfactory results must not be too great and there must not be any abrupt angles or shoulders against which the outer sides of the bead portions of the tire may abut. In practice I obtain very satisfactory results by forming the bead receiving portions 7 at an angle of substantially twelve and one-half degrees relative to any plane tangential to the peripheral extremities of the rim as exemplified by the dotted line P P in Fig. 3, but obviously a greater or a lesser angle may be used.

If the angle of portions 7 is too great the bead portions of the tire will not tighten circumferentially on said portions and will tend to slide inwardly down the inclines when in use thus destroying the practicability of the device. In a similar way any shoulder or obstruction on the rim against which the outside of the bead portions of the tire may abut will prevent the bead portions 8 from being tightened circumferentially on the portions 7. In a semi-tire, I find it necessary in order to prevent slippage of the tire on the rim to thus cause the bead portions of the tire to be forced onto, and to bind tightly circumferentially on inclined bead receiving portions 7 substantially as shown.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. In a pneumatic tire and rim construction, a rim, inclined bead receiving portions on the rim at the sides of the same, and a tire of a cross sectional shape substantially equal to but in excess of a semi-circle when seated on said rim, and having spaced apart non-elastic bead portions, each provided with an inclined base for reception on the bead receiving portions, the inclination of the bead receiving portions and beads effecting an air tight connection when the beads are on the bead receiving portions in the presence of air pressure within the tire.

2. In a tire and rim construction of the class described, a rim having an anular circumferential cavity forming an air chamber, inclined bead receiving portions provided on the edges of said rim, the outer edges of said bead receiving portions being slightly higher than the inner edges of the same, and a tire of a cross sectional shape substantially equal to but in excess of a semi-circle and having spaced apart non-elastic bead portions arranged to be forced outwardly onto said inclined bead receiving portions by pressure of air within said tire, said tire bead portions binding circumferentially on said bead receiving rim portions to form an air tight connection.

3. In a pneumatic tire and rim construction, a rim, spaced apart bead receiving portions at the sides of said rim, the outer edges of said bead receiving portions being higher than the inner edges of the same to give said bead receiving portions an angle of substantially twelve and one half degrees, and a tire having a cross sectional shape substantially equal to but in excess of a semi-circle when seated on said rim and having non-elastic bead portions each provided with an inclined base corresponding to the angle of said bead receiving rim portions, said bead portions being forced outwardly onto said inclined bead receiving rim portions by air pressure within said tire and binding firmly circumferentially on said inclined bead receiving rim portions to form an air tight connection.

The foregoing specification signed at Seattle, Washington, this 13th day of November, 1925.

ALVIN H. SHOEMAKER.